Figure 1:
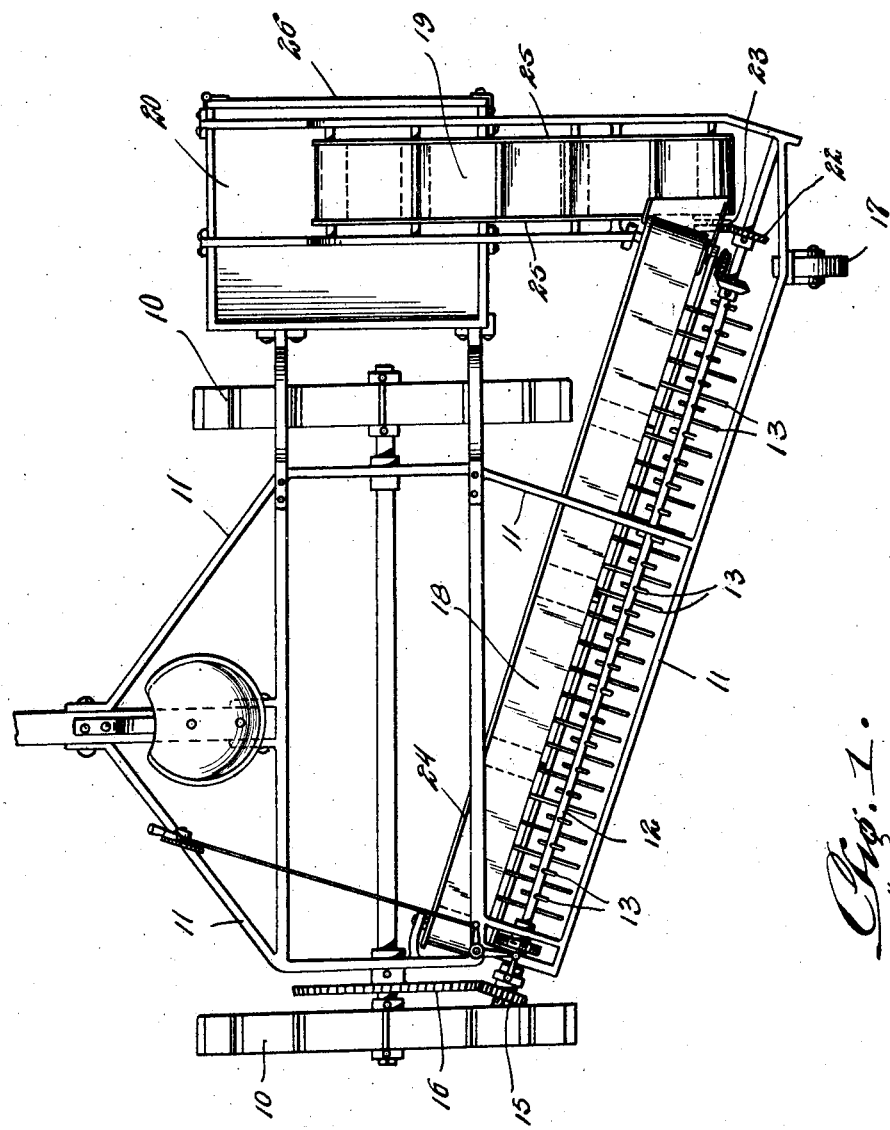

C. K. NAGY.
STONE GATHERING MACHINE.
APPLICATION FILED JAN. 8, 1921.

1,406,063.

Patented Feb. 7, 1922.
2 SHEETS—SHEET 1.

Charles K. Nagy.
INVENTOR

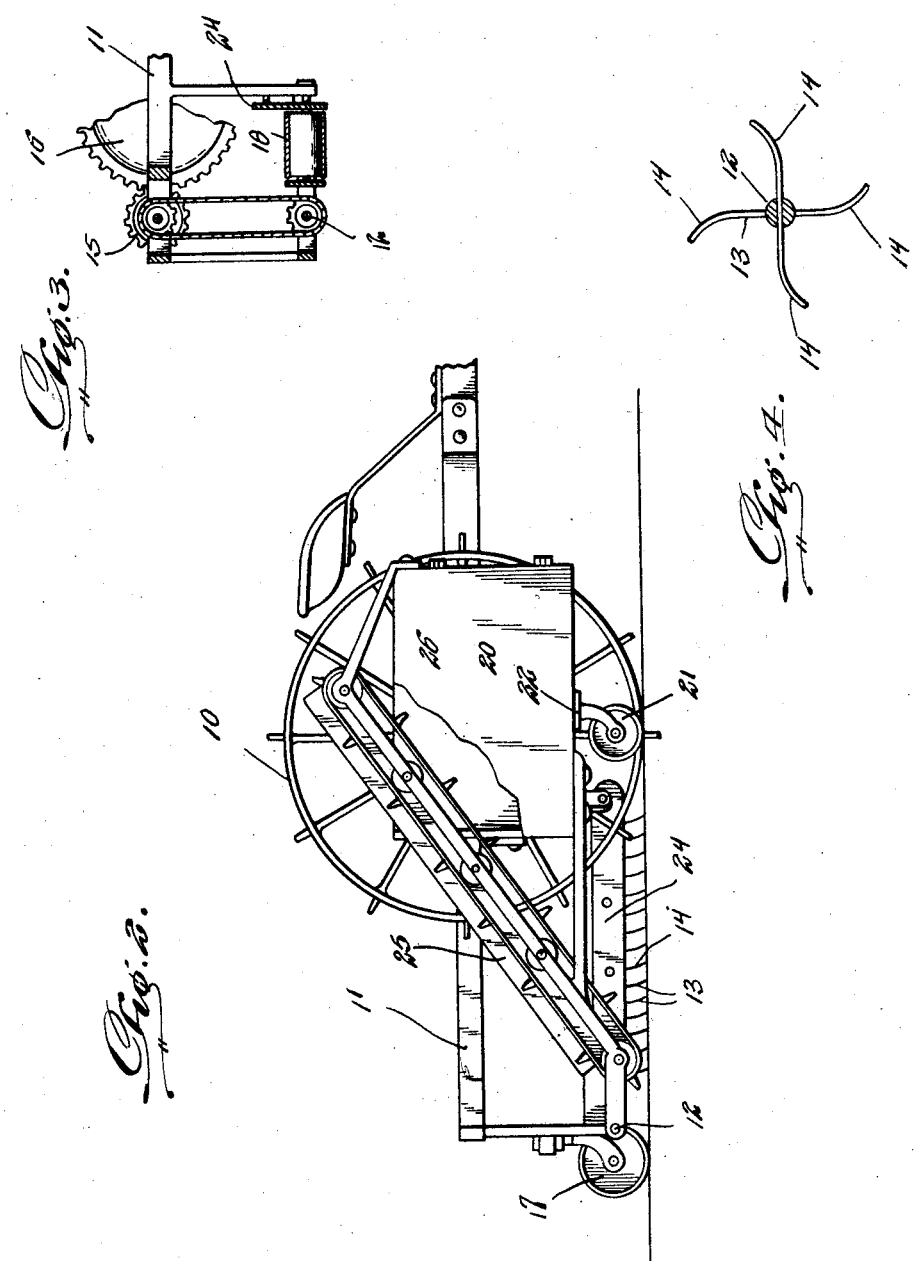

UNITED STATES PATENT OFFICE.

CHARLES K. NAGY, OF GAINESVILLE, NEW YORK.

STONE-GATHERING MACHINE.

1,406,063.     Specification of Letters Patent.     Patented Feb. 7, 1922.

Application filed January 8, 1921. Serial No. 435,938.

*To all whom it may concern:*

Be it known that I, CHARLES K. NAGY, a citizen of the United States, residing at Gainesville, in the county of Wyoming and State of New York, have invented new and useful Improvements in Stone-Gathering Machines, of which the following is a specification.

This invention comprehends the provision of a machine for gathering stones, gravel or the like from the ground and conveying the stones into a hopper carried by the machine and from which the stones can be readily and easily removed when desired.

The nature and advantages of the invention will be better understood when the following detail description is read in connection with the accompanying drawings, the invention residing in the combination, construction and arrangement of parts as claimed.

In the drawings forming part of this application, like numerals of reference indicate the similar parts in the several views and wherein:—

Figure 1—is a top plan view of the machine constructed in accordance with the invention.

Figure 2—is a side elevation.

Figure 3—is a fragmentary detail view of the driving means for the rake and the adjacent endless conveyor.

Figure 4—is a sectional view through the rake.

The machine comprises a wheeled frame, the wheels being indicated at 10, while the frame projects to one side of the wheels as shown. Mounted upon the frame 11 and diagonally disposed is a rake comprising a shaft 12 journaled in the frame for rotation, the shaft being equipped with a plurality of teeth 13, every other tooth being arranged at a right-angle to the adjacent tooth, while the extremities of each tooth are oppositely curved as at 14. One end of the shaft 12 carries a gear 15 which meshes with a gear 16 secured to one of the ground wheels 10 so that the shaft or rake is rotated during the progression of the machine. An additional wheel 17 is arranged at the rear of the machine adjacent one corner thereof as shown.

Mounted upon the machine in advance of the rake and parallel therewith is an endless conveyor 18 which is arranged obliquely to the conveyor 19 arranged at one side of the machine and leading into a hopper 20. The hopper has associated therewith a ground wheel 21 which is swivelly connected to the hopper as at 22. The opposite end of the shaft 17 of the rake carries a gear 22 which meshes with a gear 23 to operate the conveyor 19 when the machine is in motion.

In practice, when a machine is moved over the ground or surface, the stones or gravel are picked up by the rake and deposited upon the endless conveyor 18. A wall 24 prohibits the stones or the like from falling off this conveyor, which operates to transfer the stones or the like into the conveyor 19. A wall 25 is arranged adjacent the conveyor 19 for the same purpose claimed for the wall 24, and during the progression of the machine the stones are carried by the conveyor 19 into the hopper 20. The latter is provided with a hinged door 26 so that the stones or the contents of the hopper can be conveniently removed when desired.

While it is believed that from the foregoing description the nature and advantages of the invention will be better understood, I desire to have it understood that I do not limit myself to what is herein shown and described and that such changes may be resorted to when desired as fall within the scope of what is claimed.

What I claim is:—

A machine of the class described comprising a wheeled frame, a rake rotatably mounted thereon, an endless conveyor, means for operating the rake and conveyor during the progression of the machine, a hopper, a second conveyor arranged obliquely to the first mentioned conveyor to receive the material therefrom and carrying the same to the said hopper, said second mentioned conveyor being operated from said rake.

In testimony whereof I affix my signature.

CHARLES K. NAGY.